United States Patent
Alexander et al.

(10) Patent No.: US 10,401,212 B2
(45) Date of Patent: Sep. 3, 2019

(54) AUTOMATED HOPPER AND BELT CONVEYOR APPARATUS

(71) Applicant: Innovative Process Solutions, Inc., Waltham, MA (US)

(72) Inventors: Jeremiah Alexander, Spring Grove, PA (US); Harold Hargreaves Engstrom, Lincoln, MA (US)

(73) Assignee: Innovative Process Solutions, Inc., Waltham, MA (US)

( * ) Notice: Subject to any disclaimer, the term of this patent is extended or adjusted under 35 U.S.C. 154(b) by 0 days.

(21) Appl. No.: 16/072,360

(22) PCT Filed: Feb. 1, 2017

(86) PCT No.: PCT/US2017/016073
§ 371 (c)(1),
(2) Date: Jul. 24, 2018

(87) PCT Pub. No.: WO2017/136457
PCT Pub. Date: Aug. 10, 2017

(65) Prior Publication Data
US 2019/0033121 A1    Jan. 31, 2019

Related U.S. Application Data

(60) Provisional application No. 62/290,513, filed on Feb. 3, 2016.

(51) Int. Cl.
*G01G 11/08* (2006.01)
*B65G 47/18* (2006.01)
*G01G 13/24* (2006.01)

(52) U.S. Cl.
CPC ............. *G01G 11/08* (2013.01); *G01G 13/24* (2013.01); *B65G 47/18* (2013.01); *G01G 13/247* (2013.01); *G01G 13/248* (2013.01)

(58) Field of Classification Search
CPC ........ G01G 11/00; G01G 11/08; G01G 11/12; G01G 13/247; G01G 13/248; B65G 47/18
See application file for complete search history.

(56) References Cited

U.S. PATENT DOCUMENTS 3,139,271 A    6/1964  Claussen
3,623,561 A *  11/1971  Green .................... G01G 13/00
                                                          177/118
(Continued)

FOREIGN PATENT DOCUMENTS

EP        2362019 A2    8/2011

OTHER PUBLICATIONS

International Search Report of International Application No. PCT/US 17/16073 dated Apr. 28, 2017.
(Continued)

*Primary Examiner* — Randy W Gibson
(74) *Attorney, Agent, or Firm* — Gordon & Jacobson, P.C.

(57) ABSTRACT

An automated hopper and belt conveyor apparatus that can be used to feed bulk material into a mixer in order to create a feed mixture for farm animals. The automated hopper and belt conveyor apparatus includes a support frame that supports a hopper and an inclined belt conveyor that operate under control of a controller to accurately feed a desired quantity (in weight) of a bulk material item from the hopper to the mixer by forward-direction operation of the inclined belt conveyor. Excess bulk material that has been loaded into the hopper (bulk material over the desired quantity in weight) is reclaimed by the controller controlling opening a rear gate of the hopper and reverse-direction operation of the inclined belt conveyor.

19 Claims, 15 Drawing Sheets

(56) References Cited

U.S. PATENT DOCUMENTS

| | | | |
|---|---|---|---|
| 4,122,932 A | 10/1978 | Neubert et al. | |
| 4,614,264 A * | 9/1986 | Fishburne | B65G 47/5195 |
| | | | 177/121 |
| 4,669,886 A | 6/1987 | van Beek | |
| 6,329,613 B1 | 12/2001 | Tomlinson | |
| 6,523,721 B1 * | 2/2003 | Nomoto | B65G 53/44 |
| | | | 222/129 |
| 7,790,990 B2 * | 9/2010 | Kieselhorst | G01G 19/393 |
| | | | 177/25.18 |
| 2009/0101478 A1 | 4/2009 | Dale | |
| 2010/0108404 A1 * | 5/2010 | Kieselhorst | G01G 19/393 |
| | | | 177/25.18 |
| 2014/0041730 A1 | 2/2014 | Naizer et al. | |
| 2014/0062709 A1 | 3/2014 | Hyer et al. | |

OTHER PUBLICATIONS

"Automatic trailer/van/truck/container loading and unloading conveyor" Jenny Fang, Dec. 14, 2015, https://www.youtube.com/watch?v=TxH0ZWI6_5g.

* cited by examiner

AUTOMATED HOPPER AND BELT CONVEYOR APPARATUS

BACKGROUND

1. Field

The present disclosure relates to farm machinery and more particular to automated apparatus and systems used to create feed mixes for feeding farm animals.

2. State of the Art

In food production, and specifically producing animal products such as milk, beef, pork, eggs, chicken, fish etc., there is need to improve production efficiency. Production efficiency, i.e. producing the maximum quantity of animal products while minimizing the time and cost of production for those products, is important in maintaining a competitive advantage.

A farmer generally wants to maximize the amount of animal product produced (e.g. gallons of milk, pounds of beef or pork produced, etc.) while keeping the costs associated with feed at a low level in order to achieve maximum animal productivity. The maximized amount of animal product should be produced at a minimized cost to the producer. Costs to the producer include the cost of feed needed to produce the animal products, as well as the costs of related equipment and facilities needed in the production of animal products.

Farmers can increase production efficiencies is by tailoring the feed mixture which animals are fed. However, it is common that farmers do not accurately measure the quantity of the ingredients that make up the feed mixture when making the feed mixture. This can lead to the excess material ingredients in the feed mixture, which can have a negative impact on production efficiency and increased costs and bad animal health consequences. It can also lead to under-usage of material ingredients in the feed mixture, which can also have a negative impact on production efficiency and increased costs and bad animal health consequences.

SUMMARY

The present disclosure is directed to an automated hopper and belt conveyor apparatus that can be used to feed bulk material into a mixer in order to create a feed mixture for farm animals. The automated hopper and belt conveyor apparatus includes a support frame that supports a hopper and an inclined belt conveyor that operate under control of a controller to accurately feed a desired quantity (in weight) of a bulk material item from the hopper to the mixer by forward-direction operation of the inclined belt conveyor. Excess bulk material that has been loaded into the hopper (bulk material over the desired quantity in weight) can be reclaimed by the controller controlling opening of a rear gate of the hopper and reverse-direction operation of the inclined belt conveyor. The excess bulk material can be collected by the buck loader or other means and returned to the storage 27 for later use, thus minimizing waste of the bulk storage item and saving money in food costs and increasing production efficiency. These operations can be repeated for the other bulk material items of the feed mixture. The mixer can then be used to mix the feed mixture (and possibly add in other feed ingredients if need be) as desired by the operator.

DETAILED DESCRIPTION OF THE PREFERRED EMBODIMENTS

Figure 1A:
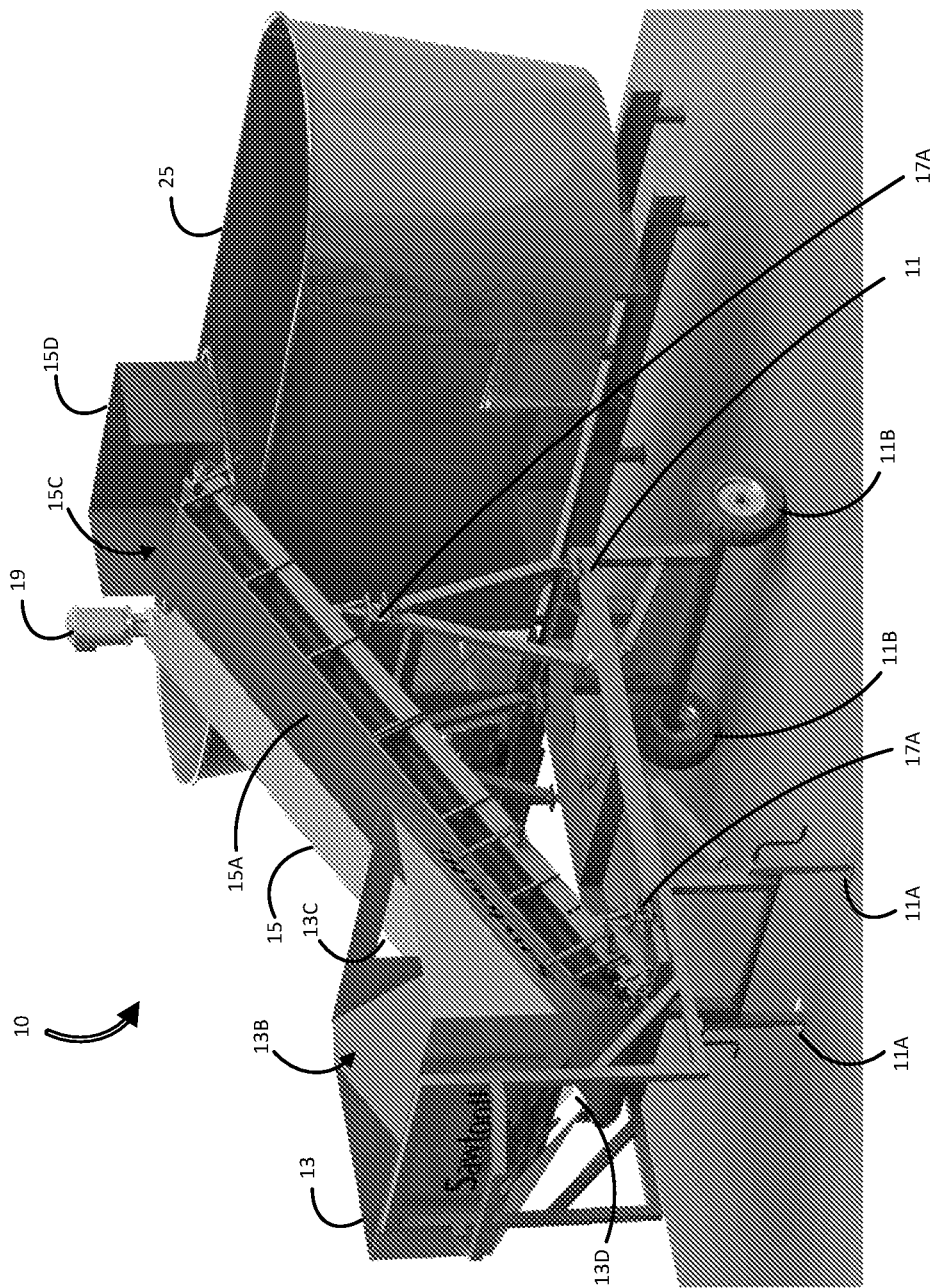
FIG. 1A is an isometric view of an embodiment of an automated hopper and belt conveyor apparatus that can be used to feed bulk material into a mixer in order to create a feed mixture for farm animals.
Figure 1B:
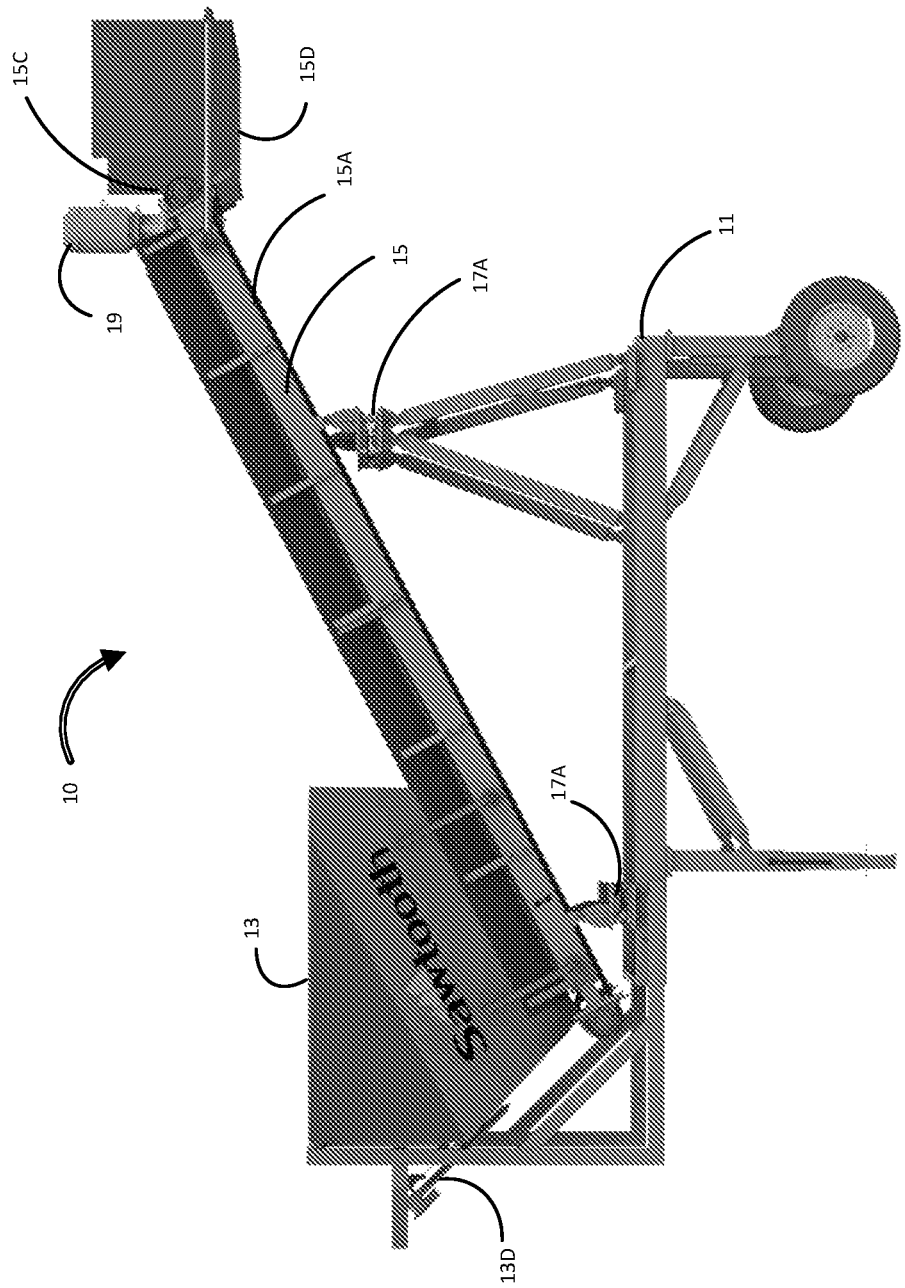
FIG. 1B is a side view of the automated hopper and belt conveyor apparatus of FIG. 1A.
Figure 1C:
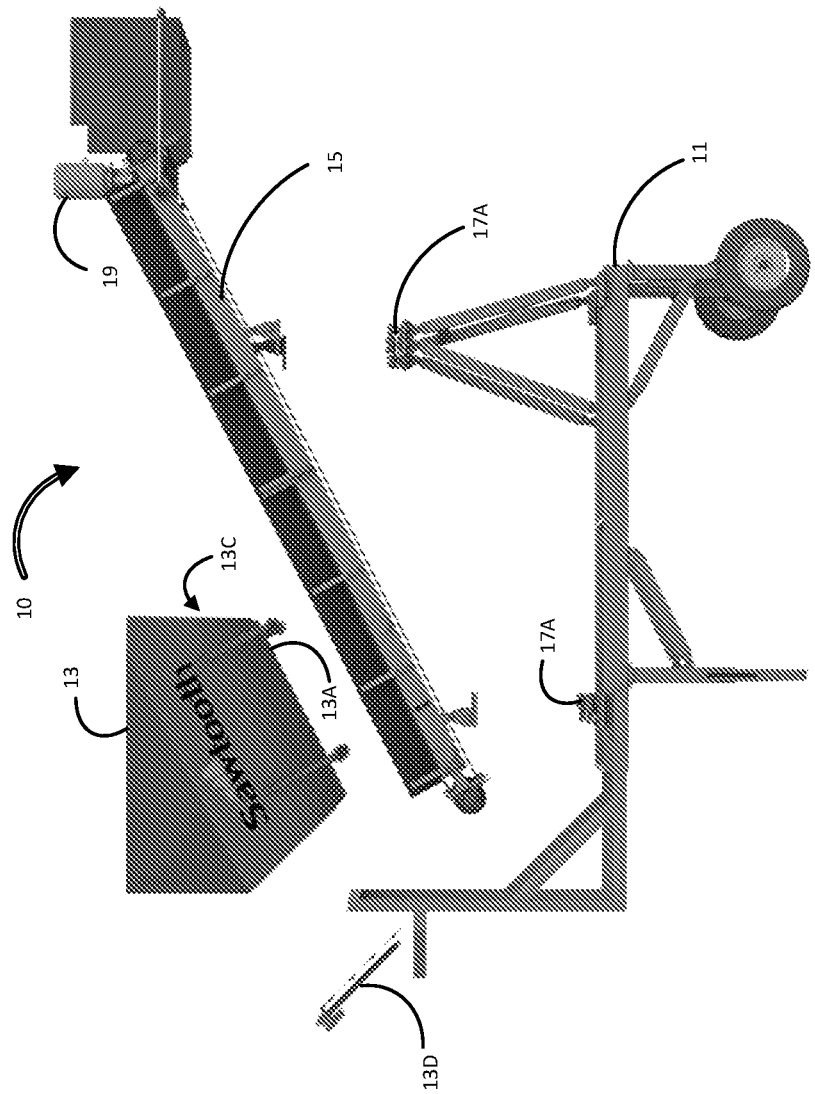
FIG. 1C is an exploded side view of the automated hopper and belt conveyor apparatus of FIG. 1A.
Figure 1D:
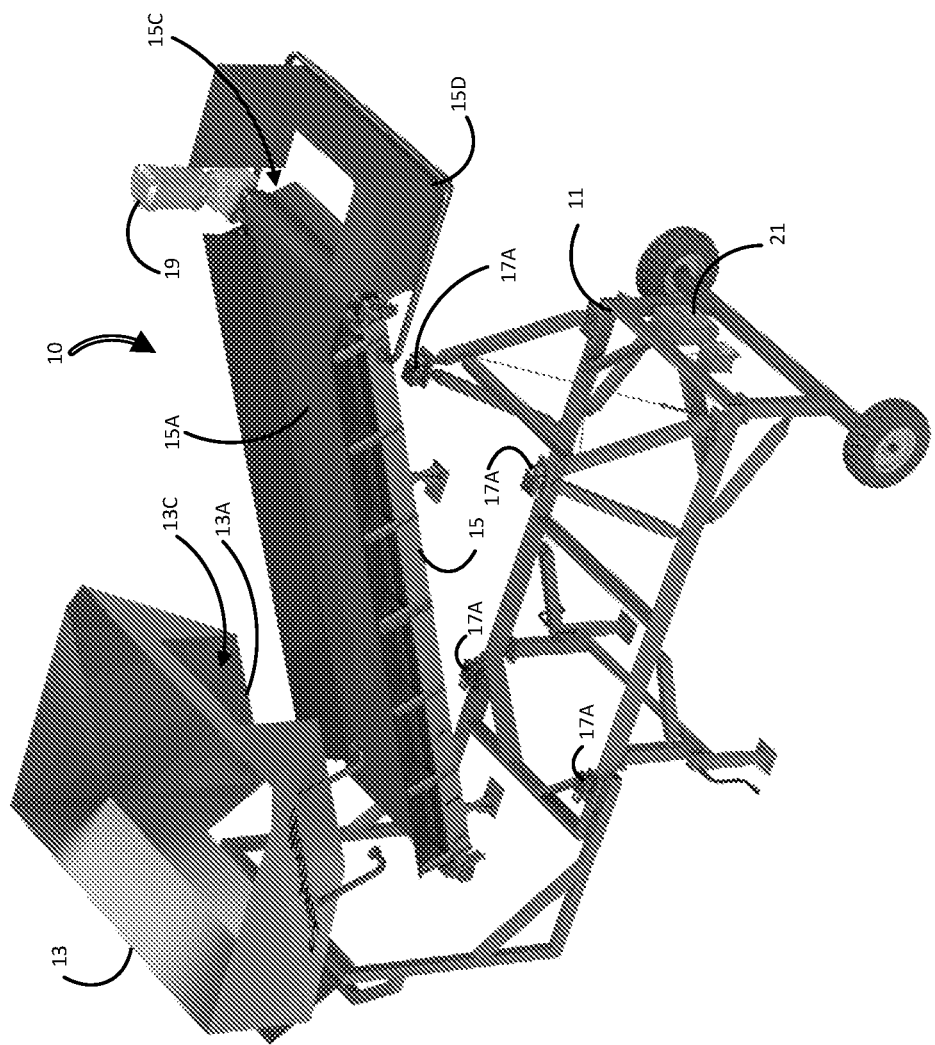
FIG. 1D is an exploded isometric view of the automated hopper and belt conveyor apparatus of FIG. 1A.

The present disclosure is directed to an automated hopper and belt conveyor apparatus 10 that can be used to feed bulk material into a mixer in order to create a feed mixture for farm animals. As shown in FIGS. 1A to 1D, the automated hopper and belt conveyor apparatus 10 includes a support frame 11 that supports a hopper 13 and an inclined belt conveyor 15. The support frame 11 can be supported on the ground or other support surface as shown in FIG. 1A. The support frame 11 can include two ground-engaging posts 11A and two wheels 11B as shown. The wheels 11B allow the apparatus 10 to moved and positioned as desired.

The hopper 13 is an open-top container structure that defines an interior space configured to hold a limited quantity of bulk material. The hopper 13 includes an inclined bottom wall 13A (best shown in the exploded view of FIG. 1C) that interfaces to the inclined belt conveyor 15 at or near the bottom of the inclined belt conveyor 15. The inclined bottom wall 13A defines an opening that accommodates the bottom of the inclined belt conveyor 15 as best shown in the exploded view of FIG. 1D. The hopper 13 also has an open top 13B that permits loading of bulk material into the interior space of the hopper 13 typically via a bucket loader or other means. The hopper 13 also includes a front opening 13C that allows bulk material that is loaded into the hopper 13 to be dispensed from the interior space of the hopper 13 and travel up the inclined belt conveyor 15 as the inclined conveyor belt 15 is operated in a forward direction. The hopper 13 also includes a rear gate 13D that is actuated by an electrically-controlled gate actuator 13E (FIG. 3) between a closed configuration and an open configuration. The closed configuration of the rear gate 13D does not permit bulk material stored in the interior space of the hopper 13 to be dispensed through the rear gate 13D (i.e., it blocks the flow of bulk material through the rear gate 13D). The open configuration of the rear gate 13D can permit bulk material stored in the interior space of the hopper 13 (if any) to be dispended through the rear gate 13D (i.e., it enables the flow of bulk material through the rear gate 13D). The bulk material that passes through the rear gate 13D in its open configuration can be collected by bucket loader or other means in order to reclaim bulk material. For example, in one embodiment, one or more diversion conveyors (e.g., diversion conveyor 916 of FIG. 9) may be located behind and below the rear gate 13D to receive and move reclaimed bulk material to a collection location. The electrically-controlled gate actuator 13E can be an electrically-controlled hydraulic actuator, an electrically-controlled motor drive mechanism or other suitable actuator.

The inclined belt conveyor 15 includes a conveyor belt 15A that is oriented in an inclined configuration as shown. The inclined belt conveyor 15 also includes an electrically-controlled conveyor motor 15B (FIG. 3), which can be controlled to drive the conveyor belt 15A in a forward direction, in a reverse direction, or stop the conveyor belt 15A. The speed of the conveyor belt 15A in the forward or reverse direction can also be controlled as desired. The operation of the conveyor belt 15A in the forward direction can dispense bulk material from the interior space of the hopper 13 and up the conveyor belt 15A for supply to the mixer 25. The mixer 25 is positioned under the top exit 15C of the conveyor belt 15A such that it receives bulk material that is supplied by the feeding operation of the hopper 13 and the inclined belt conveyor 15. The operation of the conveyor belt 15A in the reverse direction can convey bulk material that is supported on the conveyor belt 15A back into the interior space of the hopper 13 and dispense bulk material from the interior space of hopper 13 through the rear gate 13D (in its open configuration) where it can be collected by bucket loader or other means in order to reclaim bulk material. The inclined belt conveyor 15 can also include a deflector shield 15D that is located at or near the top exit 15C of the conveyor belt 15A as shown. The deflector shield 15D can be configured to deflect bulk material that is conveyed from the top exit 15C of the conveyor belt 15A such that it falls into the mixer 25 disposed under the top exit 15C of the conveyor belt 15A.

The automated hopper and belt conveyor apparatus 10 also includes a scale 17 (FIG. 3) realized by one or more weight measuring sensors (e.g., four shown as 17A in the exploded view of FIG. 1D) disposed between the support frame 11 and the inclined belt conveyor 15. The scale 17 can be configured to measure the weight of the bulk material that is contained with the interior space of hopper 13 and that is carried on the conveyor belt 15A at any given instance in time (a sampling time).

The automated hopper and belt conveyor apparatus 10 can also include one or more indicator lights 19 that are electronically-controlled to provide visual indicators of status or operational mode to the operator. In one embodiment, the indicator lights include a Fill Indicator Light, Empty indicator Light, and Dispense Indicator Light for different modes or stages of the operation of the apparatus 10 as described herein.

The automated hopper and belt conveyor apparatus 10 further includes a controller 21. The controller 21 is a control system for controlling the various elements of the system (including the inclined conveyor belt 15 and the hopper 13) for automatic feeding of bulk material from the hopper 13 using the inclined belt conveyor 15.

Figure 2:
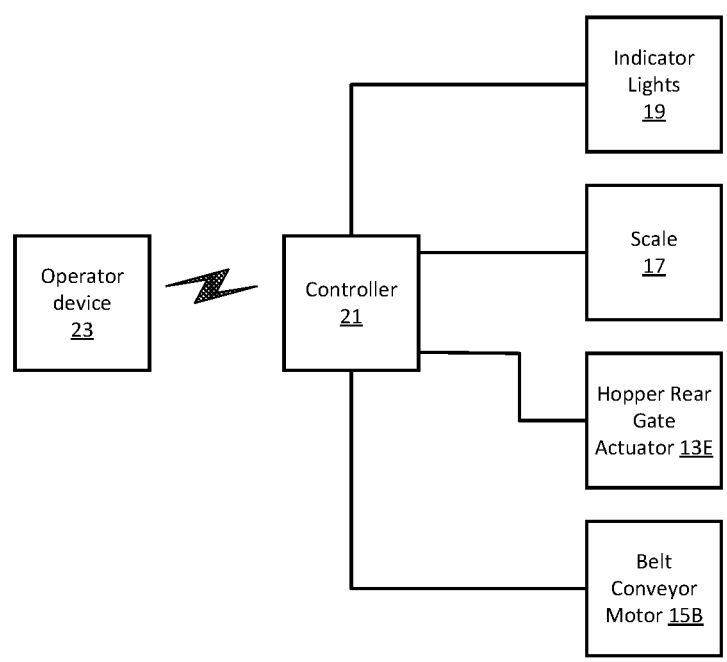
FIG. 2 is a simplified schematic diagram of an embodiment of the control system of the automated hopper and belt conveyor apparatus of FIG. 1A.

As shown in FIG. 2, the controller 21 interfaces to the indicator lights 19, the scale 17, the hopper gate actuator 13A and the belt conveyor motor 15B. Such interfaces can be wireless interfaces (such as a Wi-Fi IEEE 802.11 interface or a ZigBee IEEE 802.15.4 interface) or wired interfaces (such as an Ethernet IEEE 802.3 interface or serial USB or RS-232 interface). The controller 21 can include at least a microprocessor, microcontroller, processor module or subsystem, programmable integrated circuit, programmable gate array, digital signal processor (DSP), or another control or computing device. The controller includes computer memory for storing data (e.g., input parameters, input data provided by the other elements of the system, calculation results, and output data provided to the other elements of the system).

An operator device 23 can be used by the operator to interface to the controller 21. Such interface can be a wireless interface (such as a Wi-Fi IEEE 802.11 interface or a ZigBee IEEE 802.15.4 interface) or a wired communication interface (such as an Ethernet IEEE 802.3 interface). The operator device 23 can be a mobile computing device (such as a laptop computer, tablet computer or smart phone), a PC or other computing device, or other special-purpose electronic device. The operator device 23 can be configured to provide various control inputs to the controller 21, such as weight of one or more different bulk materials that are to be added to the mixer 25 in order to make a feed mixture for feeding farm animals. The operator device 23 can also provide various outputs to the operator, such as visual and/or audible indictors for status and/or alarm conditions, messages, etc. that result from the automatic control operation of the system.

Figure 3:
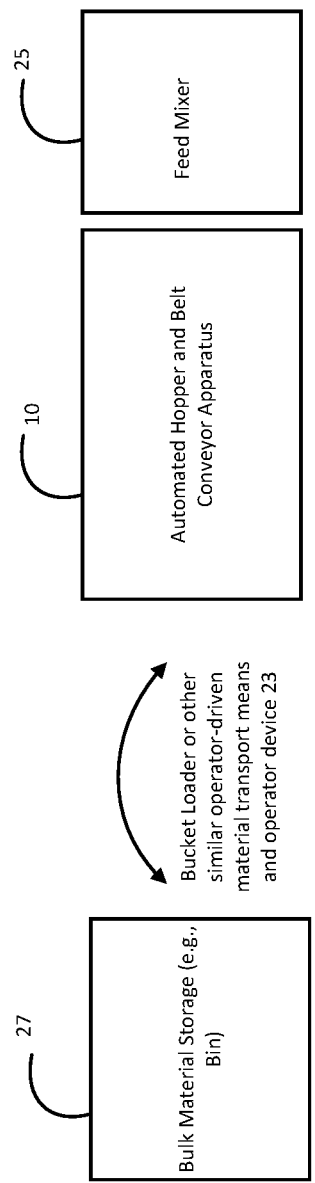
FIG. 3 is a schematic diagram showing an exemplary farm environment where the automated hopper and belt conveyor apparatus of FIG. 1A can be used to feed bulk material into a mixer in order to create a feed mixture for farm animals.

The automated hopper and belt conveyor apparatus 10 can be utilized in conjunction with the mixer 25 to make a feed mixture for feeding farm animals. The feed mixture can include one or more bulk material items such as grain, forages, ground corn, chicken litter, soybean meal, and possibly other ingredients as desired. The feed mixture can also include bulk material mineral items such as dicalcium phosphate, limestone, and mineralized salt, and possibly other mineral ingredients. As shown in FIG. 3, the one or more items of bulk material can be stored in individual storage 27 (such as an enclosed bin or silo). A quantity of each bulk material item of the feed mixture is collected from the storage 27 by a bucket loader or other means and moved to the automated hopper and belt conveyor apparatus 10 where the bulk material item is loaded into the hopper 13 of the apparatus 10. The bucket loader or other means can make one or more trips between the individual storage 27 and the apparatus 10 as needed. The automated operation of the hopper and belt conveyor apparatus 10 accurately feeds a desired quantity (in weight) of the bulk material item from the hopper 13 to the mixer 25 by the forward-direction operation of the inclined belt conveyor. Excess bulk material that has been loaded into the hopper 13 (bulk material over the desired quantity in weight) can be reclaimed by opening the rear gate 13B and reverse-direction operation of the inclined belt conveyor 15. The excess bulk material can be collected by the buck loader or other means and returned to the storage 27 for later use, thus minimizing waste of the bulk storage item and saving money in food costs. These operations can be repeated for the other bulk material items of the feed mixture. The mixer 25 can then be used to mix the feed mixture (and possibly add in other feed ingredients if need be) as desired by the operator.

Figure 4A:
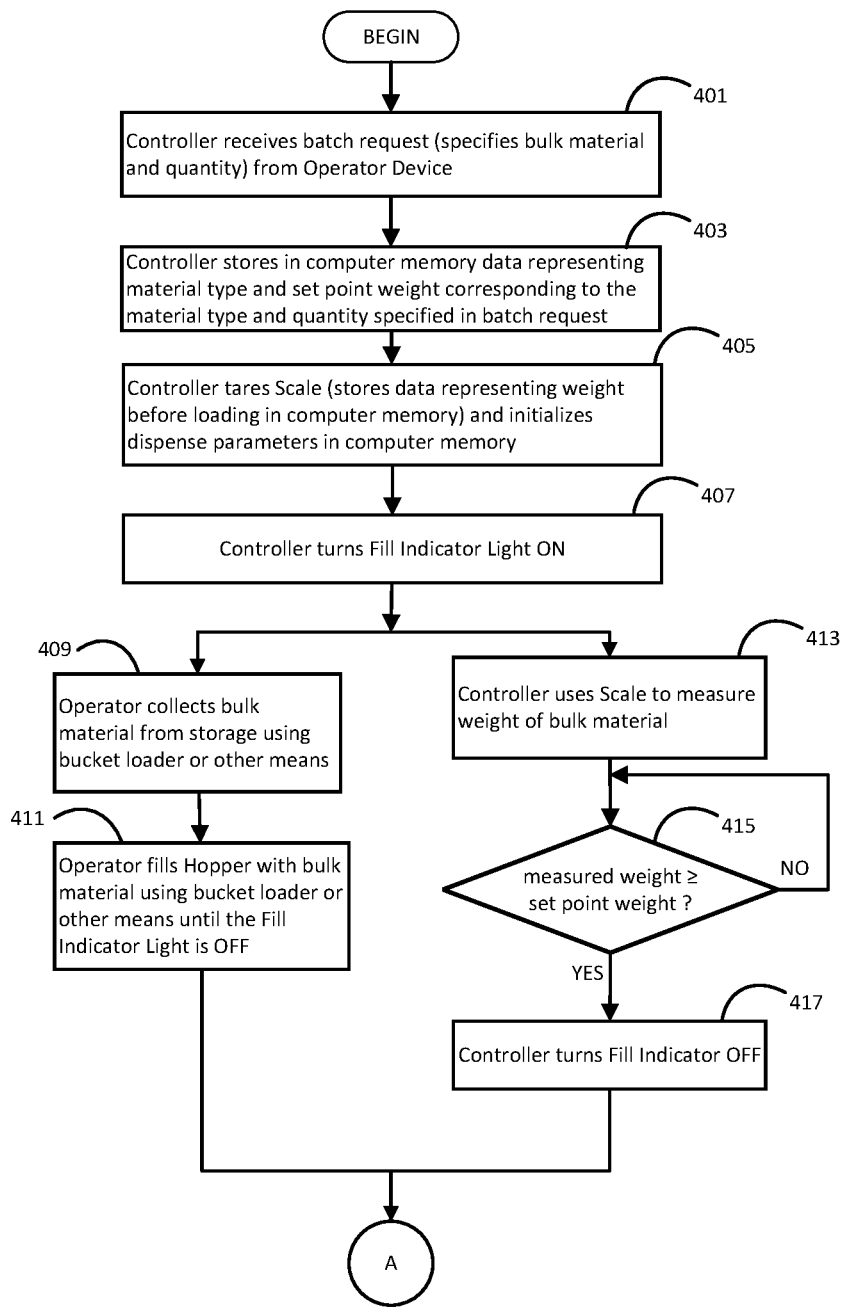
FIGS. 4A to 4C, collectively, is a workflow of exemplary operations that can be carried out by the control system of FIG. 2 according to a first embodiment where the operations feed bulk material into a mixer in order to create a feed mixture for farm animals; the operations can reclaim extra bulk material before feeding the desired quantity of bulk material to the mixer.
Figure 4B:
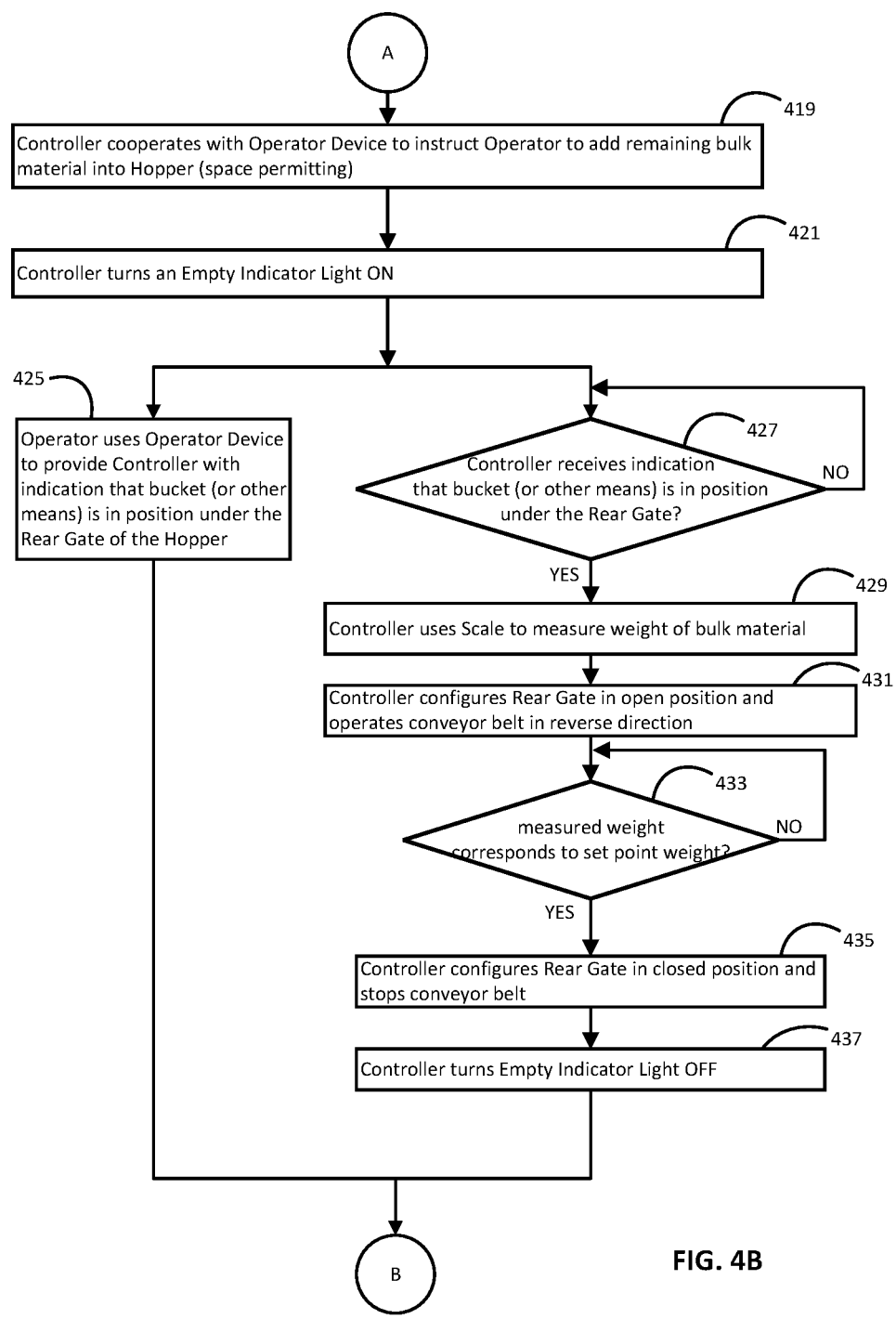
Figure 4C:
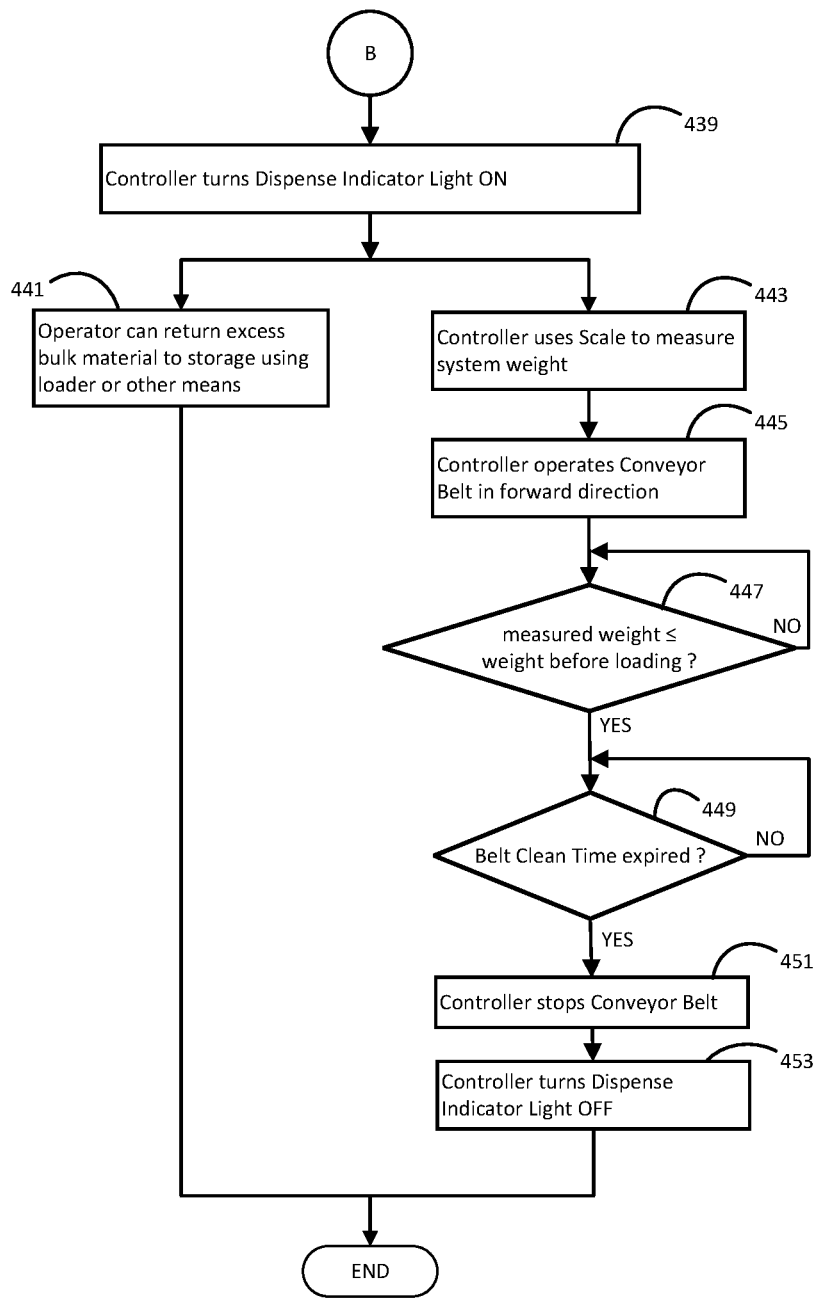

FIGS. 4A to 4C illustrates an exemplary workflow that is carried out by the automated hopper and belt conveyor apparatus 10 in making a feed mixture for feeding farm animals. The operations begin in block 401 where the controller 21 receives a batch request (which can specify a type and quantity of bulk material) from the operator device 23.

In block 403, the controller 21 stores in computer memory data representing material type and a set point weight corresponding to material type and quantity specified in batch request received in block 401.

In block 405, the controller 21 tares the scale 17 by storing in computer memory data representing the weight measured by the scale 17 before loading the hopper 13 with bulk material. The controller 21 can also initialize in computer memory certain parameters used in the workflow as needed. The controller 21 can control the rear gate actuator 13E to configure the rear gate 13D of the hopper 13 into its closed position (if the rear gate 13D is not in the closed position already). The controller 21 can also control the belt conveyor motor 15B to stop the conveyor belt 15A (if the conveyor belt 15A is not stopped already).

In block 407, the controller 21 turns a Fill Indicator Light 19 ON. The operations then continue to perform blocks 409 and 411 in parallel with blocks 413 to 417.

In block 409, the operator uses a bucket loader or other means to collect bulk material (of the type specified in the batch request of block 401) from bulk material storage 27.

In block 411, the operator loads the bulk material collected in block 409 into the interior space of the hopper 13 via the open top 13B using the bucket loader or other means until the Fill Indicator Light 19 is OFF. The operator can repeatedly collect (block 409) and load the collected bulk material into the hopper 13 (block 411) if need be.

In block 413, the controller 21 uses the scale 17 to continuously measure the weight of the bulk material that is contained within the interior space of hopper 13 and that is carried on the conveyor belt 15A. The controller 21 can measure the weight of such bulk material at a given instance in time by subtracting the weight measured by the scale 17 before loading (as stored in block 405) from the weight measured by the scale 17 at the given instance in time. In this manner, the controller 21 continuously measures the weight of the bulk material that has been added to hopper 13 in block 411.

In block 415, the controller 21 waits until it determines that the weight of the bulk material measured in block 413 is greater than or equal to the set point weight as stored in block 403. This condition should correspond to the instance in time where the weight of the bulk material that has been added to hopper 13 in block 411 is equal to (or slightly exceeds) the set point weight of block 403. Upon this determination, the operations continue to block 417.

In block 417, the controller 21 turns the Fill Indicator Light 19 OFF and the operations continue to block 419.

Upon the determination of block 415 it is expected that the weight of the bulk material that has been added to hopper 13 in block 411 is equal to (or slightly exceeds) the set point weight as stored in computer memory in block 403. Furthermore, additional bulk material can remain in the bucket loader or other means when the set point weight has been reached and the Fill Indicator Light 19 is turned OFF in block 417. In block 419, the controller 21 can cooperate with the operator device 23 to instruct the operator to add such remaining bulk material into the hopper 13 if space permits and the operations continue to block 421.

In block 421, the controller 21 turns an Empty Indicator Light 19 ON and the operations continue to perform block 425 in parallel with blocks 427 to 437.

In block 425, the operator uses the operator device 23 to provide the controller 21 with an indication that the bucket of the bucket loader (or other means) is in position under the rear gate 13D of the hopper 13.

In block 427, the controller 21 waits until it determines that it has received an indication from the operator device 23 that the bucket of the bucket loader (or other means) is in position under the rear gate 13D. Upon this determination, the operations continue to block 429.

In block 429, the controller 21 uses the scale 17 to continuously measure weight of bulk material that is contained with the interior space of hopper 13 and that is carried on the conveyor belt 15A. The controller 21 can measure such weight of the bulk material by subtracting the weight measured by the scale 17 before loading (as stored in block 405) from the weight measured by the scale 17 at the given instance in time.

In block 431, the controller 21 controls the rear gate actuator 13E to configure the rear gate 13D of the hopper 13 in its open position and controls the belt conveyor motor 15B to operate the conveyor belt 15A in its reverse direction.

In block 433, the controller 21 waits until it determines that the weight of the bulk material measured in block 429 corresponds to the set point weight as stored in block 403. Upon this determination, the operations continue to block 435.

In block 435, the controller 21 controls the rear gate actuator 13E to configure the rear gate 13D of the hopper 13 in its closed position and controls the belt conveyor motor 15B to stop the conveyor belt 15A.

In block 437, the controller 21 turns the Empty Indicator Light OFF and the operations continue to block 439.

In block 439, the controller 21 turns the Dispense Indicator Light 19 ON and the operations continue to perform block 441 in parallel with blocks 443 to 453 as follows.

In block 441, the operator can return excess bulk material that is emptied from the hopper 13 to the bulk material storage 27 using the bucket loader or other means. The excess bulk material is emptied from the hopper 13 by reverse-direction operation of the conveyor belt 15A and the open position of the rear gate 13D of block 431.

In block 443, the controller 21 uses the scale 17 to continuously measure the system weight. The controller 21 can measure the system weight at a given instance in time from the weight measured by the scale 17 at the given instance in time. Initially, it is expected that the weight of bulk material which is stored in the interior space of the hopper 13 is substantially equal to the set point weight as stored in computer memory in block 403 and such bulk material weight will contribute to the initial system weight.

In block 445, the controller 21 controls the belt conveyor motor 15B to operate the conveyor belt 15A in its forward direction.

In block 447, the controller 21 waits until it determines that the measured weight of block 443 is less than or equal to the weight before loading as stored in computer memory in block 405. Upon this determination, the operations continue to block 449.

It is expected that upon the determination of block 447 there is little or no bulk material is stored in the interior space of the hopper 13. However, in order to dispense remaining bulk material that is stored in the interior space of the hopper 13, a short Belt Clean Time period is pre-defined and the controller 21 waits until it determines that the predefined Belt Clean Time period has expired in block 449. Upon this determination, the operations continue to blocks 451 and 453.

In block 451, the controller 21 controls the belt conveyor motor 15B to stop the conveyor belt 15A.

In block 453, the controller 21 turns the Dispense Indicator Light 19 OFF and the operations end.

Figure 5:
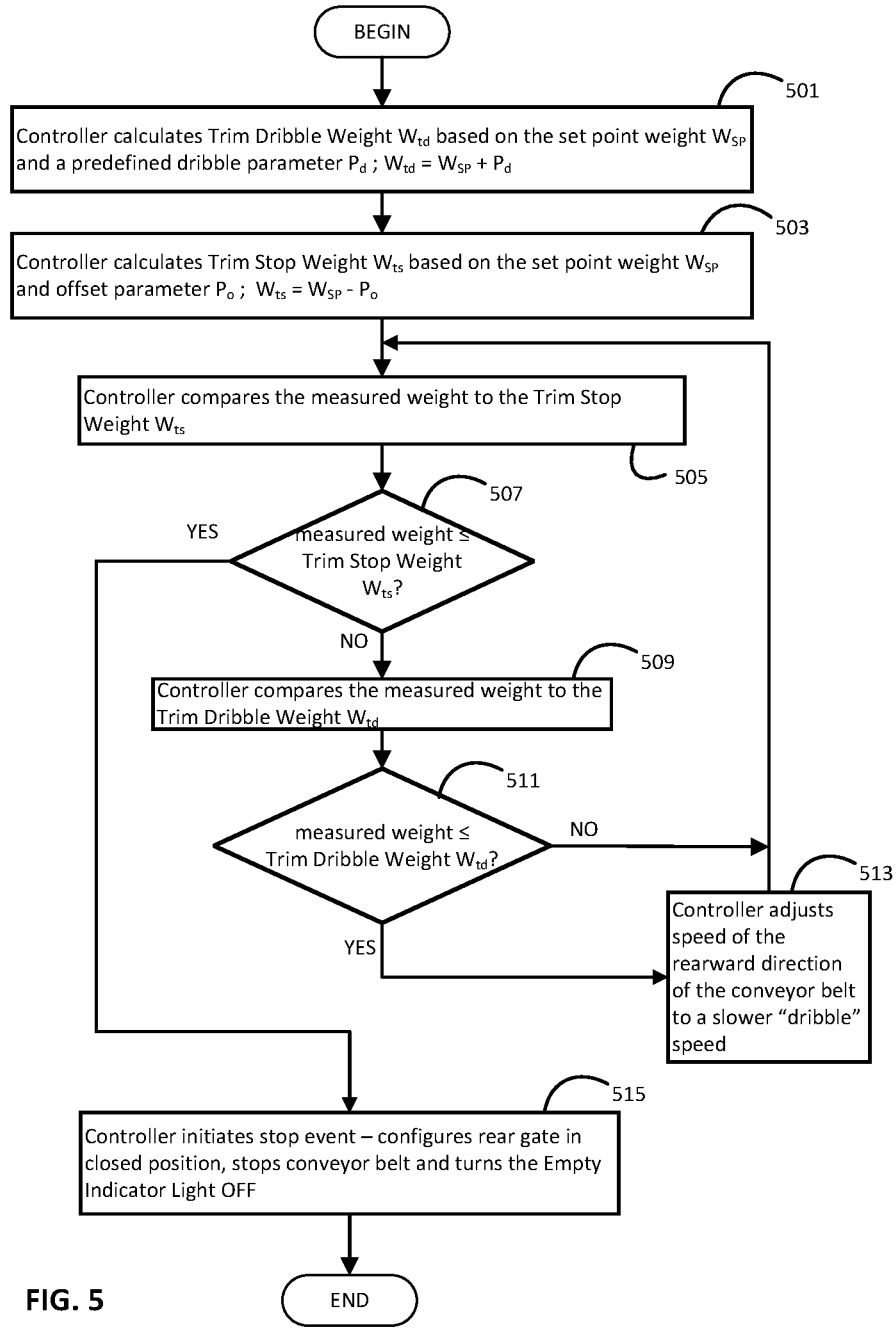
FIG. 5 illustrates exemplary operations that can be carried out as part of the workflow of FIG. 4A to 4C in order to automatically monitor and control operations that can reclaim extra bulk material before feeding the desired quantity of bulk material to the mixer.

FIG. 5 is a flow chart that illustrates an example of detail operations for block 433 of FIGS. 4A to 4C in order to determine that the measured weight corresponds to the set point weight. The operations begin in block 501 where the controller 21 calculates a Trim Dribble Weight $W_{td}$ based on the set point weight $W_{SP}$ (block 403) and a dribble parameter $P_d$ ($W_{td}=W_{SP}+P_d$). The dribble parameter $P_d$ can be fixed by design, input by the operator, or possibly calculated (e.g., adjusted) dynamically based on historical operation of the control operations. The dribble parameter $P_d$ can be stored in the computer memory of the controller 21 for access in block 501.

In block 503, the controller 21 calculates a Trim Stop Weight $W_{ts}$ based on the set point weight $W_{SP}$ (block 403) and an offset parameter $P_o$ ($W_{ts}=W_{SP}-P_o$). The offset parameter $P_o$ can be fixed by design, input by the operator, or possibly calculated (e.g., adjusted) dynamically based on historical operation of the control operations. The offset parameter $P_o$ can be stored in the computer memory of the controller 21 for access in block 503.

In block 505, the controller 21 compares the measured weight to the Trim Stop Weight $W_{ts}$. The measured weight at a given instance in time can be derived by subtracting the weight measured by the scale 17 before loading (as stored in block 405) from the weight measured by the scale 17 at the given instance in time.

In block 507, the controller 21 determines if the measured weight is less than or equal to the Trim Stop Weight $W_{ts}$. If so, the operations continue to bock 515. If not, the operations continue to block 509.

In block 509, the controller 21 compares the measured weight to the Trim Dribble Weight $W_{td}$. Hereto, the measured weight at a given instance in time can be derived by subtracting the weight measured by the scale 17 before loading (as stored in block 405) from the weight measured by the scale 17 at the given instance in time.

In block 511, the controller 21 determines if the measured weight is less than or equal to the Trim Dribble Weight $W_{td}$. If so, the operations continue to block 513. If not, the operations return to block 505.

In block 513, the controller 21 controls the belt conveyor motor 15B to adjust speed of the rearward direction of the conveyor belt to a slower "dribble" speed and the operations return to block 505.

In block 515, the controller 21 initiates a stop event, which controls the rear gate actuator 13E to configure the rear gate 13D in its closed position, control the belt conveyor motor 15B to stop the conveyor belt 15A and turns the Empty Indicator Light 19 OFF.

Figure 6A:
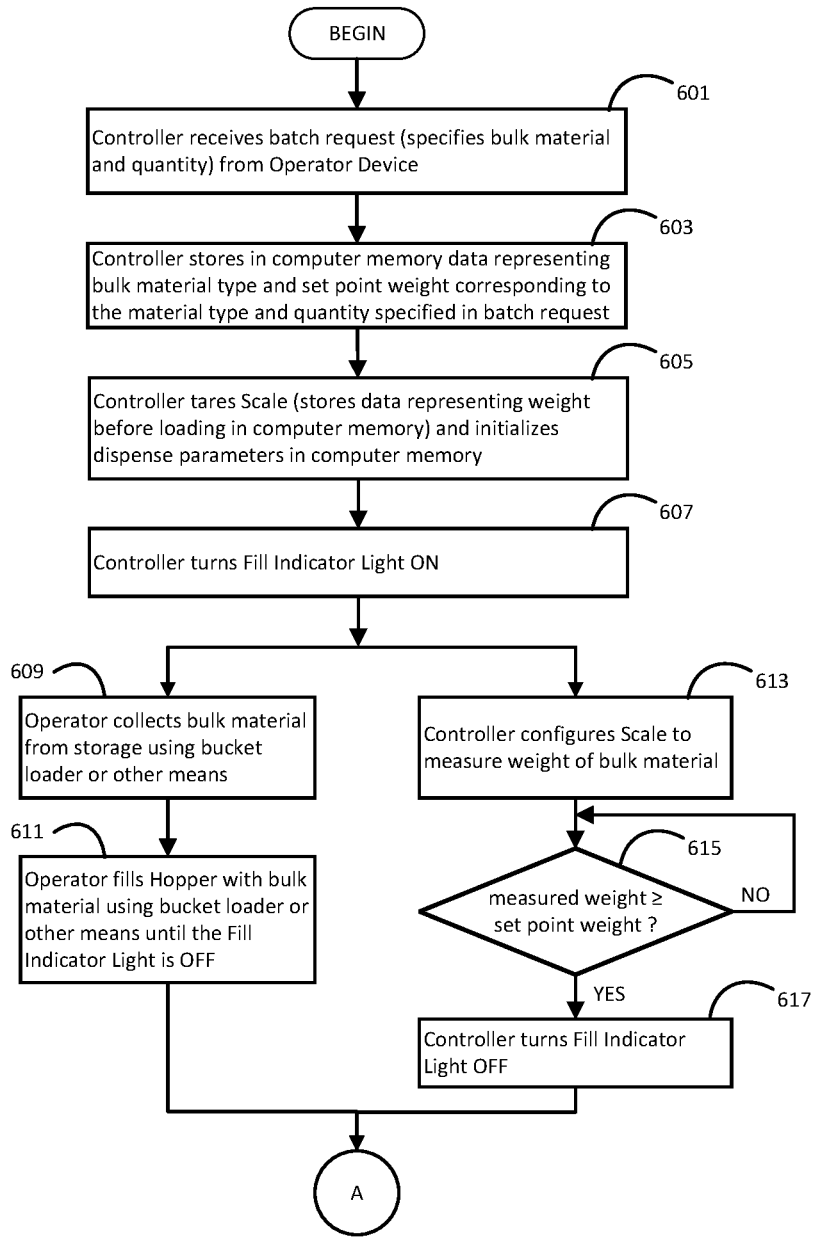
FIGS. 6A to 6C, collectively, is a workflow of exemplary operations carried out by the control system of FIG. 2 according to a second embodiment where the operations feed bulk material into a mixer in order to create a feed mixture for farm animals; the operations can reclaim extra bulk material after feeding the desired quantity of bulk material to the mixer.
Figure 6B:
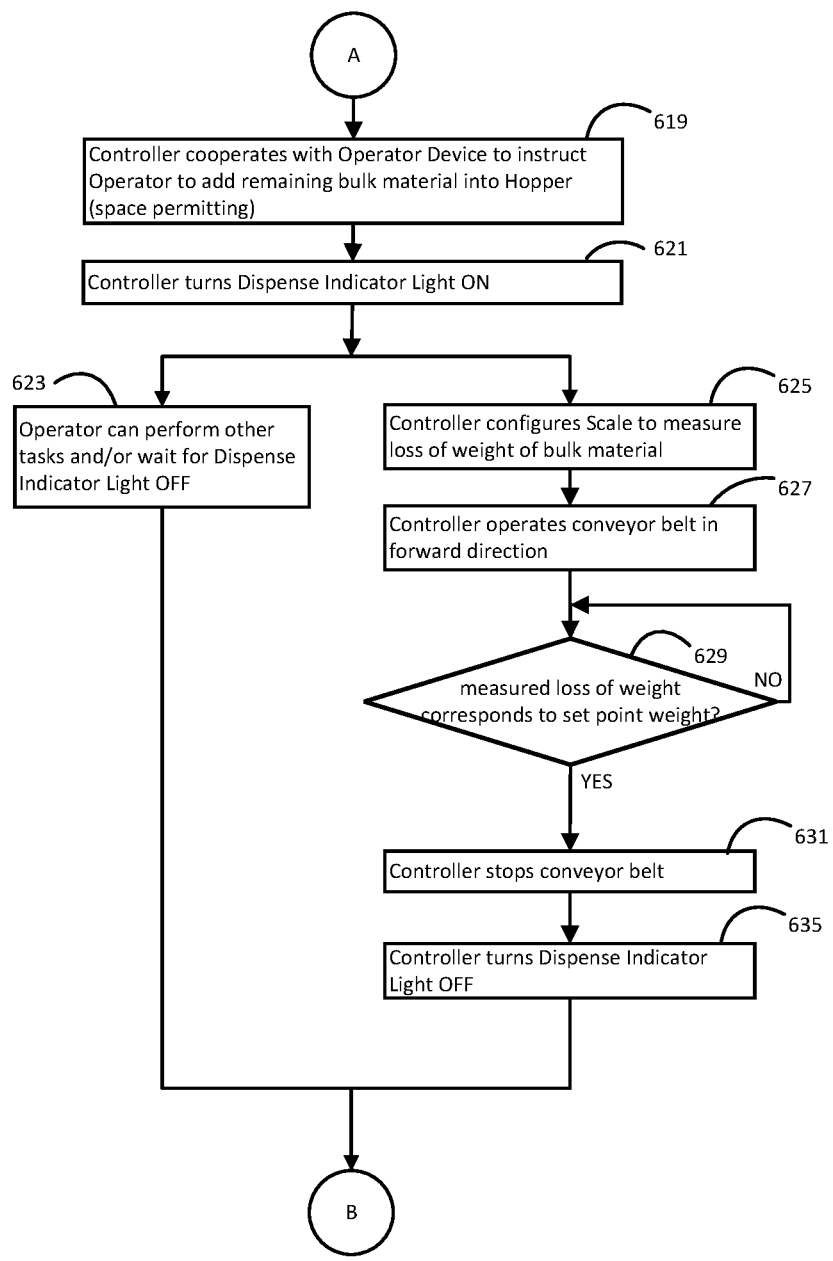
Figure 6C:
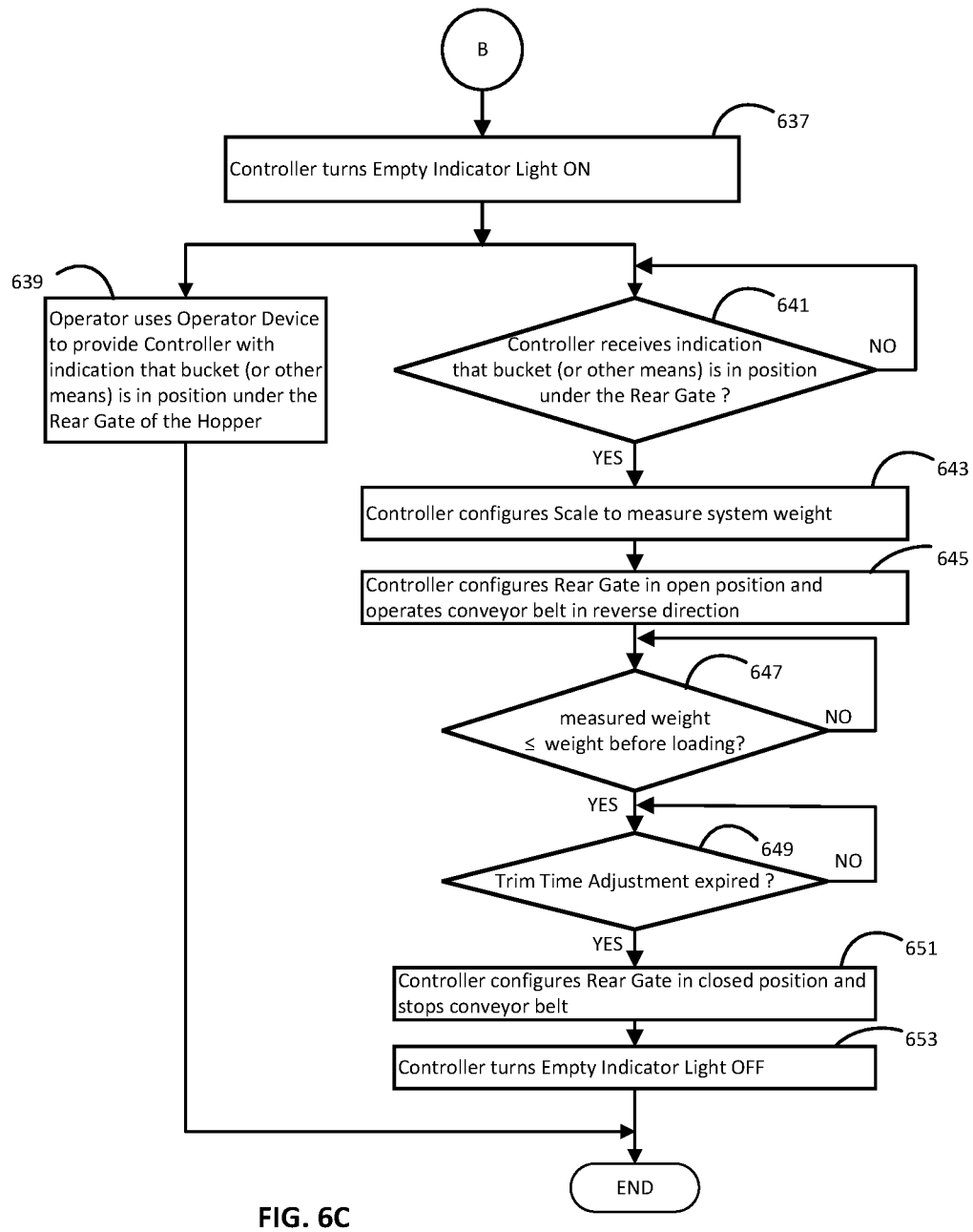

FIGS. 6A to 6C illustrate another exemplary workflow that is carried out by the automated hopper and belt conveyor apparatus 10 in making a feed mixture for feeding farm animals. The operations begin in block 601 where the controller 21 receives a batch request (which can specify a type and quantity of bulk material) from the operator device 23.

In block 603, the controller 21 stores in computer memory data representing material type and a set point weight corresponding to material type and quantity specified in batch request received in block 601.

In block 605, the controller 21 tares the scale 17 by storing in computer memory data representing the weight measured by the scale 17 before loading the hopper 13 with bulk material. The controller 21 can also initialize in computer memory certain parameters used in the workflow as needed. The controller 21 can control the rear gate actuator 13E to configure the rear gate 13D of the hopper 13 into its closed position (if the rear gate 13D is not in the closed position already). The controller 21 can also control the belt conveyor motor 15B to stop the conveyor belt 15A (if the conveyor belt 15A is not stopped already).

In block 607, the controller 21 turns a Fill Indicator Light 19 ON. The operations then continue to perform blocks 609 and 611 in parallel with blocks 613 to 617.

In block 609, the operator uses a bucket loader or other means to collect bulk material (of the type specified in the batch request of block 601) from bulk material storage 27.

In block 611, the operator loads the bulk material collected in block 609 into the interior space of the hopper 13 via the open top 13B using the bucket loader or other means until the Fill Indicator Light 19 is OFF. The operator can repeatedly collect (block 609) and load the collected bulk material into the hopper 13 (block 611) if need be.

In block 613, the controller 21 uses the scale 17 to continuously measure the weight of the bulk material that is contained with the interior space of hopper 13 and that is carried on the conveyor belt 15A. The controller 21 can measure the weight of the bulk material that is contained with the interior space of hopper 13 and that is carried on the conveyor belt 15A at a given instance in time by subtracting the weight measured by the scale 17 before filling (as stored in block 605) from the weight measured by the scale 17 at the given instance in time. In this manner, the controller continuously measures the weight of the bulk material that has been added to hopper 13 in block 611.

In block 615, the controller 21 waits until it determines that the weight of the bulk material measured in block 613 is greater than or equal to the set point weight of block 603. This condition should correspond to the instance in time where the weight of the bulk material that has been added to hopper 13 in block 611 is equal to (or slightly exceeds) the set point weight of block 603. Upon this determination, the operations continue to block 617.

In block 617, the controller 21 turns the Fill Indicator Light 19 OFF and the operations continue to block 619.

Upon the determination of block 615 it is expected that the weight of the bulk material that has been added to hopper 13 in block 611 is equal to (or slightly exceeds) the set point weight as stored in computer memory in block 603. Furthermore, bulk material can remain in the bucket loader when the set point weight has been reached and the Fill Indicator Light 19 is turned OFF in block 617. In block 619, the controller 21 can cooperate with the operator device 23 to instruct the operator to add such remaining bulk material into the hopper 13 if space permits and the operations continue to block 621.

In block 621, the controller 21 turns the Dispense Indicator Light 19 ON and the operations continue to perform block 623 in parallel with blocks 625 to 635 as follows.

In block 623, the operator can perform other tasks and/or wait for the Dispense Indicator Light to turn OFF.

In block 625, the controller 21 uses the scale 17 to continuously measure the loss of weight of bulk material. The controller 21 can measure the loss of weight of bulk material at a given instance in time by subtracting the weight measured by the scale 17 at the given instance in time from the weight measured by the scale 17 after the hopper load operation(s) of block 611 is (are) finished.

In block 627, the controller 21 controls the belt conveyor motor 15B to operate the conveyor belt 15A in its forward direction.

In block 629, the controller 21 waits until it determines that the measured loss of weight of block 625 corresponds to set point weight as stored in computer memory in block 603. Upon this determination, the operations continue to blocks 631 and 633.

In block 631, the controller 21 controls the belt conveyor motor 15B to stop the conveyor belt 15A.

In block 635, the controller 21 turns the Dispense Indicator Light 19 OFF and the operations continue to block 637.

In block 637, the controller 21 turns an Empty Indicator Light 19 ON and the operations continue to perform block 639 in parallel with blocks 641 to 653.

In block 639, the operator uses the operator device 23 to provide the controller 21 with an indication that the bucket of the bucket loader (or other means) is in position under the rear gate 13D of the hopper 13.

In block 641, the controller 21 waits until it determines that it has receive an indication from the operator device 23 that the bucket of the bucket load (or other means) is in position under the rear gate 13D. Upon this determination, the operations continue to block 643.

In block 643, the controller 21 uses the scale 17 to continuously measure system weight. The controller 21 can measure the system weight at a given instance in time from the weight measured by the scale 17 at the given instance in time. Note that the initially any excess bulk material that is stored in the interior space of the hopper 13 or carried on the inclined belt conveyor 15 will contribute to the system weight.

In block 645, the controller 21 controls the rear gate actuator 13E to configure the rear gate 13D of the hopper 13 in its open position and controls the belt conveyor motor 15B to operate the conveyor belt 15A in its reverse direction.

In block 647, the controller 21 waits until it determines that the system weight measured in block 643 is less than or equal to the weight before loading as stored in memory in block 605. Upon this determination, the operations continue to block 649.

It is expected that upon the determination of block 647 there is little or no bulk material is stored in the interior space of the hopper 13. However, in order to dispense remaining bulk material that is stored in the interior space of the hopper 13, a short Trim Time Adjustment period is pre-defined and the controller 21 waits until it determines that the predefined Trim Time Adjustment period has expired in block 449. Upon this determination, the operations continue to blocks 651 and 653.

In block 651, the controller 21 controls the rear gate actuator 13E to configure the rear gate 13D of the hopper 13 in its closed position and controls the belt conveyor motor 15B to stop the conveyor belt 15A.

In block 653, the controller 21 turns the Empty Indicator Light OFF and the operations end.

Figure 7:
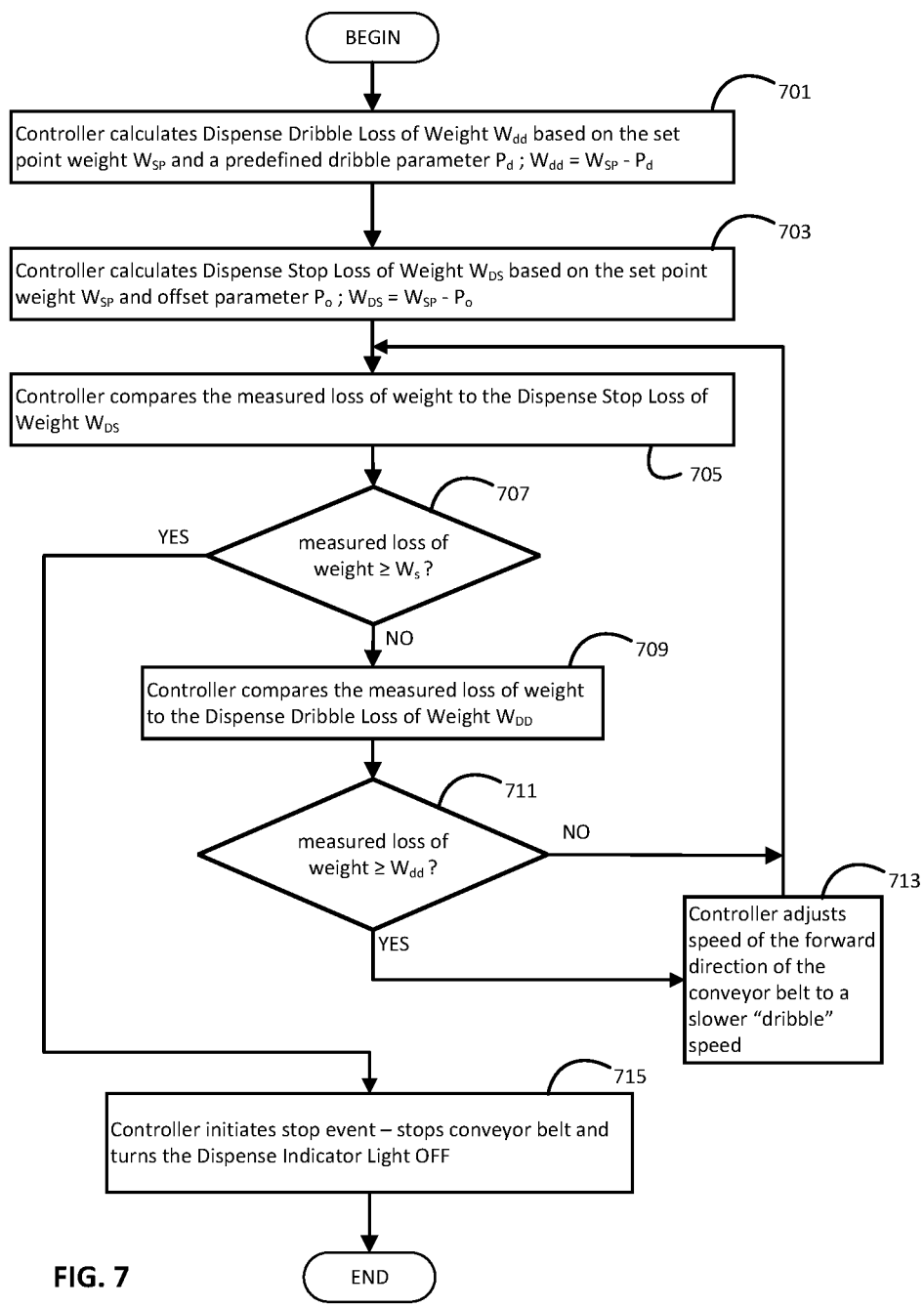
FIG. 7 illustrates exemplary operations that can be carried out as part of the workflow of FIG. 4A to 4C in order to automatically monitor and control operations that can reclaim extra bulk material after feeding the desired quantity of bulk material to the mixer.

FIG. 7 is a flow chart that illustrates an example of detail operations for block 629 of FIGS. 6A to 6C in order to determine that the measured loss of weight corresponds to the set point weight. The operations begin in block 701 where the controller 21 calculates a Dispense Dribble Loss of Weight $W_{dd}$ based on the set point weight $W_{SP}$ (block 603) and a predefined dribble parameter $P_d$ ($W_{dd}=W_{SP}-P_d$).

In block 703, the controller 21 calculates a Dispense Stop Loss of Weight $W_{ds}$ based on the set point weight $W_{SP}$ (block 603) and an offset parameter $P_o$ ($W_{ds}=W_{SP}-P_o$).

In block 705, the controller 21 compares the measured loss of weight to the Dispense Stop Loss of Weight $W_{ds}$. The measured loss of weight can be derived by subtracting the weight measured by the scale 17 at the given instance in time from the weight measured by the scale 17 after the hopper load operation(s) of block 611 is (are) finished.

In block 707, the controller 21 determines if the measured loss of weight is greater than or equal to the Dispense Stop Loss Weight $W_{ds}$. If so, the operations continue to block 715. If not, the operations continue to block 709.

In block 709, the controller 21 compares the measured loss of weight to the Dispense Dribble Loss of Weight $W_{dd}$. Hereto, the measured loss of weight can be derived by subtracting the weight measured by the scale 17 at the given instance in time from the weight measured by the scale 17 after the hopper load operation(s) of block 611 is (are) finished.

In block 711, the controller 21 determines if the measured loss of weight is greater than or equal to the Dispense Dribble Loss of Weight $W_{dd}$. If so, the operations continue to block 713. If not, the operations return to block 705.

In block 713, the controller 21 controls the belt conveyor motor 15B to adjust speed of the forward direction of the conveyor belt to a slower "dribble" speed and the operations return to block 705.

In block 715, the controller 21 initiates a stop event, which controls the belt conveyor motor 15B to stop the conveyor belt 15A and turns the Dispense Indicator Light 19 OFF.

Figure 8:
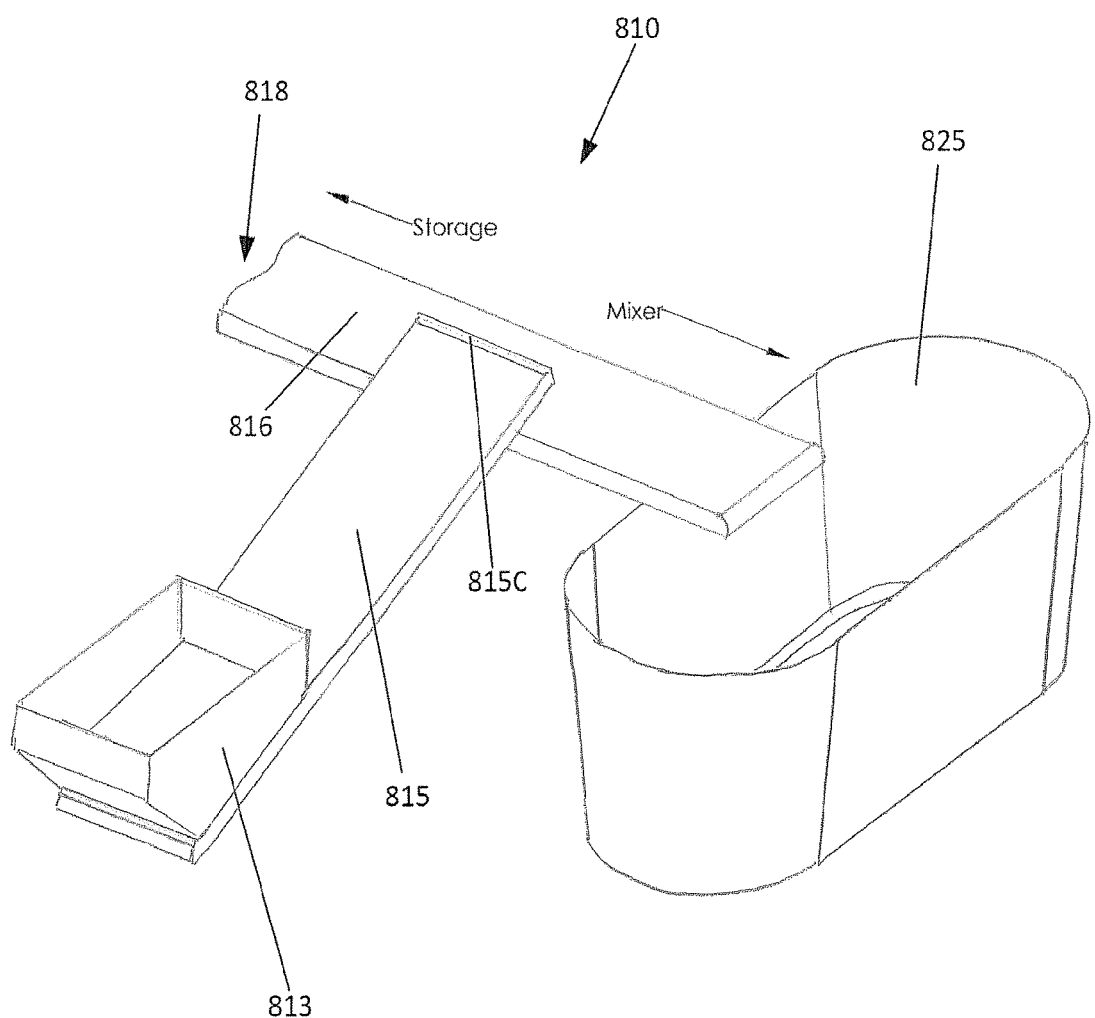
FIG. 8 is an isometric view of another embodiment of an automated hopper and belt conveyor apparatus that can be used to feed bulk material into a mixer in order to create a feed mixture for farm animals.

FIG. 8 shows an embodiment of an automated hopper and belt conveyor apparatus 810, similar to apparatus 10, and where like elements are incremented by "800". The apparatus 810 includes an inclined belt conveyor 815, having the same construction as conveyor 15, described above. Also, the apparatus 810 includes a diversion conveyor 816, shown located at a top exit 815C of the inclined belt conveyor 815. As described above with respect to apparatus 10, when loading material into the mixer 25, bulk material is elevated by the inclined belt conveyor 15 toward the top exit 15C of the conveyor belt 15A. However, when apparatus 810 is used, instead of bulk material falling directly into the mixer 825 from inclined belt conveyor 815, any bulk material at the top exit 815C falls onto the diversion conveyor 816, which has a motor that can operate the diversion conveyor 816 in either of a forward-direction (to move the material toward the mixer 825) or a reverse-direction (to move the material toward a storage location 818). The storage location 818 may be at the end of the diversion conveyor 816 opposite the mixer 825, at which location a bucket of a bucket loader may be stationed to reclaim excess bulk material, as discussed in further detail below.

In use, the diversion conveyor 816 and the inclined conveyor 815 are selectively configured to operate together in a first configuration to move material from the hopper 813 to the mixer 825 or in a second configuration to move material from the hopper 813 to the storage location 818. For example, when it is desired to fill the mixer 825 with bulk material from the hopper 813, the diversion conveyor 816 and the inclined belt conveyor 815 are both selectively operated in a forward direction to move the material from the hopper 813, up the inclined belt conveyor 815 to the diversion conveyor 816, and to the mixer 825. When it is desired to reclaim any excess bulk material in the hopper 813 and/or on the conveyors 815 and 816, the inclined belt conveyor 815 may be selectively operated in the forward direction while the conveyor 816 may be selectively operated in a reverse direction so that bulk material moves up the inclined conveyor 815 and onto the conveyor 816, whereupon the material is moved to the storage location 818. Thus, the embodiment of the apparatus 810 shown in FIG. 8 may be selectively configured to reclaim excess material without opening a rear gate of hopper 813 and/or reversing the direction of the inclined belt conveyor 815.

There have been described and illustrated herein several embodiments of an automated hopper and belt conveyor apparatus and method and system using the same. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. An automated hopper and belt conveyor apparatus comprising:
   a hopper and an inclined belt conveyor supported by a support frame and controlled by a controller, wherein the hopper has a rear gate that is operable under control of the controller;
   wherein the hopper and inclined belt conveyor operate under control of the controller to feed a desired quantity of a bulk material item from the hopper to a mixer by forward-direction operation of the inclined belt conveyor with the rear gate of the hopper in a closed configuration; and
   wherein excess bulk material that has been loaded into the hopper is reclaimed by the controller controlling opening the rear gate of the hopper and reverse-direction operation of the inclined belt conveyor.

2. An apparatus according to claim 1, further comprising:
   a scale that interfaces to the controller, wherein the scale is configured to measure weight of bulk material that is stored in the hopper and carried on the inclined belt conveyor at a given instance in time.

3. An apparatus according to claim 2, wherein:
   the controller cooperates with the scale to control the operations of the hopper and inclined belt conveyor that feed the desired quantity of the bulk material item from the hopper to the mixer by forward-direction operation of the inclined belt conveyor.

4. An apparatus according to claim 3, wherein:
   the excess bulk material is reclaimed by the controller controlling the rear gate of the hopper into an open configuration and reverse-direction operation of the inclined belt conveyor before the hopper and inclined belt conveyor feed the desired quantity of the bulk material item from the hopper to the mixer.

5. An apparatus according to claim 3, wherein:
   the excess bulk material is reclaimed by the controller controlling the rear gate of the hopper into an open configuration and reverse-direction operation of the inclined belt conveyor after the hopper and inclined belt conveyor feed the desired quantity of the bulk material item from the hopper to the mixer.

6. An automated method of controlling a hopper and belt conveyor apparatus that includes a hopper and an inclined belt conveyor supported by a support frame and controlled by a controller, wherein the hopper has a rear gate that is operable under control of the controller, the method comprising:
   operating the hopper and inclined belt conveyor under control of the controller to feed a desired quantity of a bulk material item from the hopper to a mixer by forward-direction operation of the inclined belt conveyor with the rear gate of the hopper in a closed configuration; and
   reclaiming excess bulk material that has been loaded into the hopper by the controller controlling opening the rear gate of the hopper and reverse-direction operation of the inclined belt conveyor.

7. A method according to claim 6, further comprising:
   using a scale to measure weight of bulk material that is stored in the hopper and carried on the inclined belt conveyor at a given instance in time.

8. A method according to claim 7, wherein:
   the operation of the hopper and inclined belt conveyor that feeds the desired quantity of the bulk material item from the hopper to the mixer is controlled by the controller based on the weight of bulk material measured by the scale.

9. A method according to claim 8, wherein:
   the excess bulk material is reclaimed by the controller controlling the rear gate of the hopper into an open configuration and reverse-direction operation of the inclined belt conveyor before the desired quantity of the bulk material item is fed from the hopper to the mixer.

10. A method according to claim 8, wherein:
    the excess bulk material is reclaimed by the controller controlling the rear gate of the hopper into an open configuration and reverse-direction operation of the inclined belt conveyor after the desired quantity of the bulk material item is fed from the hopper to the mixer.

11. A method according to claim 6, further comprising:
    the controller receiving a batch request specifying the desired quantity of material.

12. A method according to claim 6, wherein:
    during forward direction operation, the controller adjusts a speed of the conveyor from a first non-zero speed to a second non-zero speed.

13. A method according to claim 12, wherein:
    the speed of the conveyor is based on a measurement of weight of bulk material carried on the inclined belt conveyor at a given instance in time.

14. A method according to claim 6, wherein:
    during reverse-direction operation, the controller adjusts a speed of the conveyor from a first non-zero speed to a second-non-zero speed.

15. A method according to claim 14, wherein:
    the speed of the conveyor is based on a measurement of weight of bulk material carried on the inclined belt conveyor at a given instance in time.

16. A method according to claim 6, wherein:
    the excess bulk material is reclaimed by the controller controlling the rear gate of the hopper into an open configuration and reverse-direction operation of the inclined belt conveyor.

17. A method according to claim 6, wherein:
the desired quantity of the bulk material comprises a specified weight of the bulk material.

18. An apparatus according to claim 1, wherein:
the excess bulk material is reclaimed by the controller controlling the rear gate of the hopper into an open configuration and reverse-direction operation of the inclined belt conveyor.

19. An apparatus according to claim 1, wherein:
the desired quantity of the bulk material comprises a specified weight of the bulk material.

* * * * *